(12) United States Patent
Feng et al.

(10) Patent No.: US 6,861,937 B1
(45) Date of Patent: Mar. 1, 2005

(54) DOUBLE WINDING TWIN COIL FOR THIN-FILM HEAD WRITER

(75) Inventors: Aiguo Feng, Fremont, CA (US); Dennis Rafferty, San Jose, CA (US); Wei Xiong, Fremont, CA (US); Yiming Huai, Pleasanton, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 0 days.

(21) Appl. No.: 10/180,161

(22) Filed: Jun. 25, 2002

(51) Int. Cl.$^7$ ................................................ H01F 5/00
(52) U.S. Cl. ...................... 336/200; 360/122; 360/123; 156/649
(58) Field of Search ........................ 336/200; 360/317, 360/123, 121, 122, 125; 156/649, 643, 653, 657; 29/602.1, 603.24

(56) References Cited

U.S. PATENT DOCUMENTS

| | | | |
|---|---|---|---|
| 4,416,056 A | 11/1983 | Takahashi | 29/603 |
| 4,639,289 A | 1/1987 | Lazzari | 156/643 |
| 4,684,438 A * | 8/1987 | Lazzari | 216/22 |
| 5,113,300 A * | 5/1992 | Ikeda et al. | 360/126 |
| 5,396,389 A | 3/1995 | Terada et al. | 360/123 |
| 5,666,249 A | 9/1997 | Ohmori et al. | 360/123 |
| 5,671,106 A | 9/1997 | Lehureau | 360/121 |
| 5,796,564 A | 8/1998 | Shouji et al. | 360/123 |
| 5,856,898 A | 1/1999 | Ohashi | 360/123 |
| 6,074,566 A | 6/2000 | Hsiao et al. | 216/2 |
| 6,178,070 B1 | 1/2001 | Hong et al. | 360/317 |

* cited by examiner

*Primary Examiner*—Lincoln Donovan
*Assistant Examiner*—Jennifer A. Poker
(74) *Attorney, Agent, or Firm*—Joshua C. Harrison, Esq.; Milad G. Shara, Esq.; Samuel A. Kassatly, Esq.

(57) ABSTRACT

An enhanced inductive coil design for use in data storage magnetic disk drives with areal density over 35 Gb/in$^2$, features a double wound twin coil that is able to achieve a yoke length of 15 μm or less by reducing the insulation spacing between the two coils. The coil further presents improved reliability by reducing the possibility of occurrence of electrical shorting. The coil is made by forming two interleafing conductors on the same layer with a demesne process. A tri-level process is implemented in the layout of the first conductor to ensure that the coil width and spacing are uniform and even, in order for the second conductor to be wound therebetween. A conformal dielectric layer of approximately 0.1 to 0.2 μm in thickness is deposited between the two conductors and serves as insulation. The two conductors are formed by a copper seed layer plating process that eliminates potential damage to the conductors during production.

32 Claims, 11 Drawing Sheets

DOUBLE WINDING TWIN COIL FOR THIN-FILM HEAD WRITER

FIELD OF THE INVENTION

The present invention relates in general to data storage systems such as disk drives, and it particularly relates to a thin film read/write head for use in such data storage systems. More specifically, the present invention relates to an advanced inductive coil design and manufacturing process for thin film heads. The new inductive coil design features a double wound twin coil having a shorter yoke length relative to a conventional design while maintaining at least the same number of coil turns. The new coil design and process enable the disk drive to achieve a greater areal density, hence greater storage capacity than a conventional coil design.

BACKGROUND OF THE INVENTION

In a conventional magnetic storage system, a thin film magnetic head includes an inductive read/write transducer mounted on a slider. The thin film head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. An exemplary thin film magnetic head includes a plurality of write poles, also known as P1 and P2, that encapsulate a magnetically inductive coil disposed by a recess from the air bearing surface (ABS). During a write operation, the inductive coil cooperates with the poles P1 and P2 to generate a magnetic field that directs the magnetic flux from the pole P1 to the pole P2 through the magnetic disk onto which digital data are to be recorded.

In a conventional magnetic media application, the magnetic recording disk is comprised of several concentric tracks onto which magnetization bits are deposited for data recording. Each of these tracks is further divided into sectors wherein the digital data are registered. As the demand for large capacity magnetic storage continues to grow at an ever increasing pace, the current trend in the magnetic storage technology has been proceeding toward a high track density design of magnetic storage media. In order to maintain the industry standard interface, magnetic storage devices increasingly rely on reducing track width as a means to increase the areal density without significantly altering the geometry of the storage media.

As the track width becomes smaller, the size of the thin film head must also be reduced accordingly. This reduction necessitates an accompanied decrease in the physical dimension allowance of the inductive coil, also known as the yoke length. While the coil yoke length decreases, the demand for high areal density continues to impose the same or greater requirement for the coil density, which is the number of coil turns per coil area.

To address the coil size and density requirements, various attempts have been developed. One such attempt is exemplified by U.S. Pat. No. 4,416,056 to Takahashi, which discloses a conventional inductive coil comprising of two plane coil layers that are formed by a plurality of spirally wound conductors arranged in an alternating pattern. By doubling the number of coil layers, the coil density increases proportionally.

In general, the conventional inductive coil according to the Takahashi patent is manufactured using a chemical wet etching process to create the pattern of the coil winding. Prior to the wet etch, the coil pattern is formed by a photolithographic process involving the deposition of a photo resist layer onto a conductor substrate surface. By exposing the photo resist layer to an ultraviolet light source through a photo mask, the coil pattern photographic image is formed. The wet etch is then applied to the exposed photo resist to remove the exposed photo resist material, leaving behind on the substrate the patterned conductors that form the coil winding.

The inductive coil process according to the Takahashi patent presents a number of disadvantages that significantly offset the benefit of high areal density of the conventional coil design. Some of these disadvantages are described as follows:

During the preparation process prior to the photolithography, a layer of dielectric material is deposited onto the conductor substrate surface to provide insulation between the coil layers prior to the deposition of the photo resist layer. With reference to FIG. 1, which illustrates a conventional coil process, due to the physical imperfection of the dielectric material, there likely exist various tiny openings or pinholes 1, formed in the dielectric layer 3. Thus, during the wet etch process which is designed to remove the exposed photo resist material, the etching solution may seep through the pin holes 1 in the dielectric layer 3 to permeate into the underlying conductor surface 5, thereby likely resulting in a damage to the coil. In some instances, the etching solution may penetrate far enough to cause damage to the write pole P1. As a consequence, a considerable endeavor is required to ensure that the dielectric layer is free of pinholes 1, which in itself is a difficult task to accomplish.

Yet another disadvantage with the Takahashi design is the coil size limitation due to the alignment process and the physical limitation of the photo resist. The coil windings are separated by a gap of width "d." This gap is formed after a wet etch during which the exposed photo resist material is removed therefrom. In order to form this gap, a photo mask 7 must be aligned with the photo resist layer with high precision. As the demand for high coil density increases, the coil size becomes smaller and so does the gap width "d." As a result, the alignment becomes more challenging, resulting in a potential misalignment which could adversely affect the quality and production of the conventional inductive coils.

Furthermore, the photo resist typically reaches a physical limitation of about 0.2 $\mu$m. Thus, both the alignment problem and the photo resist limitation impose a size constraint on the conventional inductive coil. As a result, conventional inductive coils as exemplified by the Takahashi patent, may not be further enhanced beyond their maximum limit as dictated by the foregoing size constraint, thus preventing these coils from meeting the demand for greater areal density in high capacity disk drives. Currently, a conventional coil design may have reached its size limitation of 17 $\mu$m with a coil density of 9 turns per coil.

As the demand for high capacity magnetic storage continues to grow, the size of inductive coils needs to be reduced in order to increase the areal density, while the coil density remains the same or greater. Consequently, a demand for an improved inductive coil design and process is needed. This improved coil design preferably utilizes an enhanced process that would promote high magnetic efficiency for high areal density recording without potentially causing damage to the coil conductors. Moreover, the improved coil design should be able to meet the demand for a decreased coil size imposed by the technology advancement without being affected by the size constraints currently faced by conventional inductive coil design.

SUMMARY OF THE INVENTION

It is a feature of the present invention to present a new enhanced inductive coil design for use in data storage magnetic disk drives with areal density over 35 Gb/in$^2$. The enhanced inductive coil design of the present invention features a double wound twin coil concept using the following process:

1. The twin coil is built on the same layer with a demesne process.
2. A tri-level process is implemented in the layout of the first coil to ensure that the coil width and spacing are uniform and even, in order for the second coil to be wound therebetween.
3. A conformal dielectric layer of approximately 0.1 to 0.2 $\mu$m in thickness is deposited between the two coils to serve as insulation.
4. The coils are formed by a copper (Cu) seed layer plating process which eliminates the potential damage to the coils during production.

The foregoing and other features of the present invention are realized by a coil and method the same by forming an insulation layer. Then, using a reaction ion etching process (RIE), the first coil pattern is formed, followed by a deposition process and/or plating process to form the first coil (also referred to as first coil elements). It should be understood that the first coil could alternatively be formed using another conventional or available process.

Subsequently, the first coil is planarized using a chemical-mechanical polishing process, followed by a RIE process which is inert relative to the metallic composition of the first coil to remove the remaining insulation layer. A Plasma-Enhanced Chemical Vapor Deposition (PECVD) process is used to form a second insulation layer to cover the first coil. The PECVD process is highly conformal and is pinhole free.

The second coil is then formed on the second insulation layer using a deposition process and/or plating process. A chemical-mechanical polishing process is then used to planarize the second coil. In an alternative embodiment, the insulation layer separating the first and second coils is removed by a reactive ion etching process.

Using the enhanced process of the present invention, the new coil design is able to achieve a smaller yoke length of 15 $\mu$m or less while maintaining at least the same number of coils per turn as a result of the reduction in the insulation spacing between the two coils. A further advantage of the enhanced coil design of the present invention is the improved reliability by reducing the electrical shorting possibility realized by the seed layer ion milling process.

BRIEF DESCRIPTION OF THE DRAWINGS

The features of the present invention and the manner of attaining them, will become apparent, and the invention itself will be understood by reference to the following description and the accompanying drawings, wherein:

FIGS. 8 through 19 illustrate a manufacturing sequence for fabricating second coil elements of the double winding twin coil of FIGS. 5 and 6 according to a preferred embodiment of the present invention.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
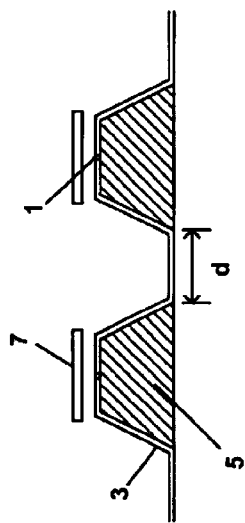
FIG. 1 is a cross-sectional view of a prior art inductive coil including a coil gap and a photo mask.
Figure 2:
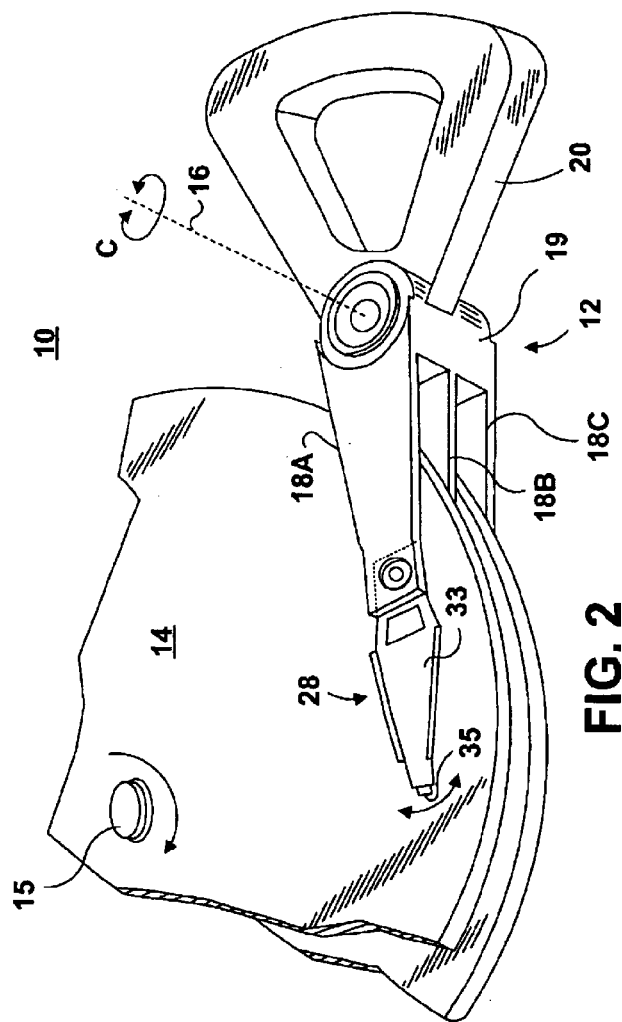
FIG. 2 is a fragmentary perspective view of a data storage system utilizing a read/write head of the present invention.
Figure 3:
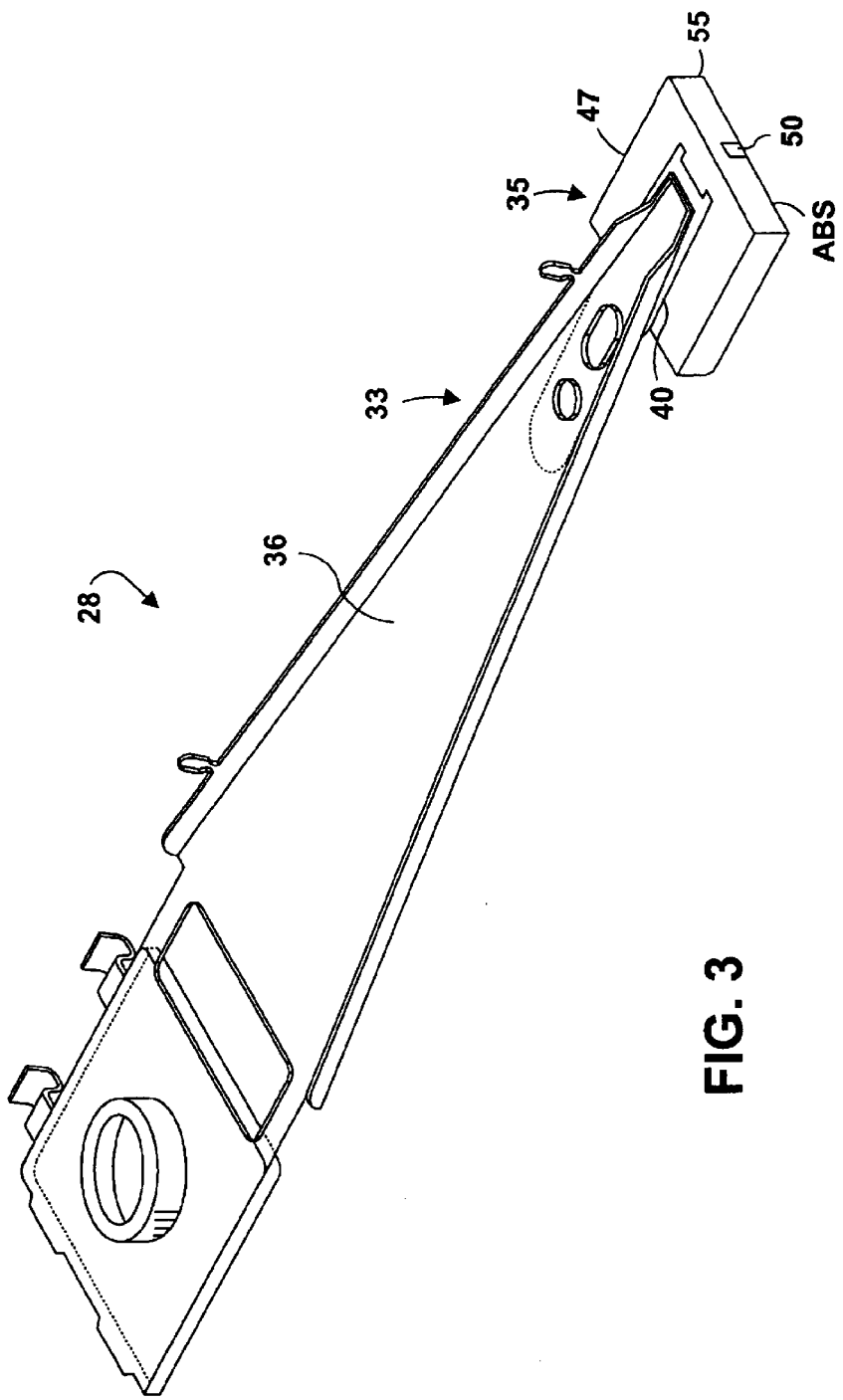
FIG. 3 is a perspective view of a head gimbal assembly comprised of a suspension and a slider to which the read/write head of FIG. 2 is secured, for use in a head stack assembly.

FIG. 2 illustrates a disk drive 10 comprised of a head stack assembly 12 and a stack of spaced apart magnetic data storage disks or media 14 that rotate about a common shaft 15. The head stack assembly 12 is pivoted about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47. The read/write element 50 is mounted at the trailing edge 55 of the slider 47 so that its forwardmost tip is generally flush with the air bearing surface (ABS) 65 of the slider 47.

Figure 4:
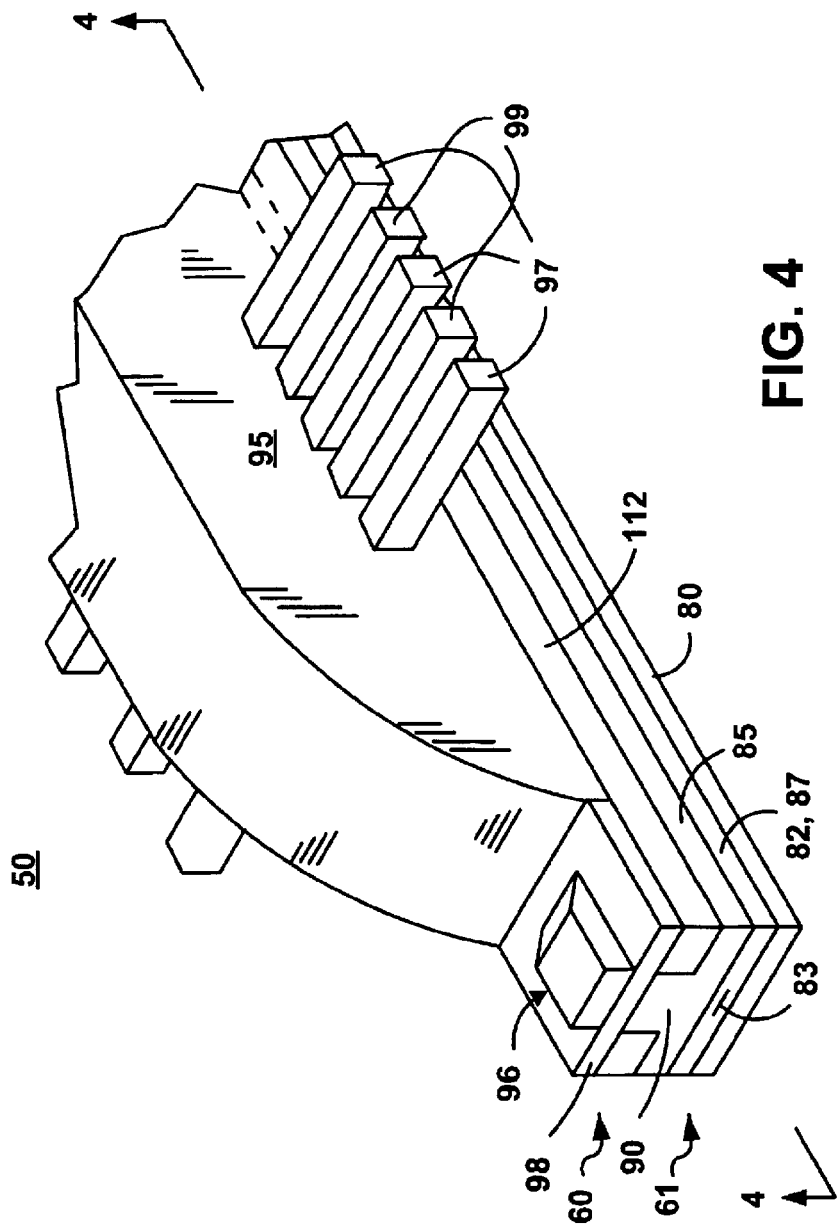
FIG. 4 is an enlarged perspective view of a thin film read/write element (with the top yoke removed for clarity of illustration) forming part of the read/write head of FIGS. 2 and 3.

The details of the read/write element 50 will now be described with reference to FIGS. 4 and 5. The read/write element 50 integrates a write section 60 and a read section 61. The read section 61 is formed of a first shield layer (Shield 1) 80 preferably made of a material that is both magnetically and electrically conductive. An insulating layer 82 is formed over substantially the entire surface of the first shield layer 80 to define a non-magnetic, transducing read gap 87.

The read section 61 is also comprised of a read sensor 83 formed within the insulation layer 82. The read sensor 83 can be any suitable sensor, including but not limited to a magnetoresistive (MR) element, a giant magnetoresistive (GMR) element, a spin valve, or a Current In the Plane mode (CIP) sensor. Further, the read section 61 also includes a second shield layer (Shield 2) 85 that is made of an electrically and magnetically conductive material, which may be similar or equivalent to that of the first shield layer 80. The second shield layer 85 is formed over substantially the entire surface of the insulating layer 82.

The write section 60 typically includes a thin film write head with a bottom pole 90 (P1) and a top pole 96 (P2). The bottom pole P1 is made of magnetically conductive material, and be for example only, similar or equivalent to that of the first shield layer 80. The pedestal region 120 is formed on the bottom pole P1 from the ABS to the back face 92 which defines the zero throat level with extreme accuracy. The pole tip region is defined as the region between the ABS and the zero throat level.

The top pole P2 is made of a magnetically conductive material, and be for example only, similar or equivalent to that of the first shield layer 80 and the bottom pole P1. The top pole P2 is formed over, and is separated from the pedestal 120, to define a write gap 98 therewith. The thickness of the top pole P2 can be substantially the same as, or similar to that of the first shield layer 80. The write gap 98 can be filled with a material similar or equivalent to that of the insulating layer 82.

Figure 5:
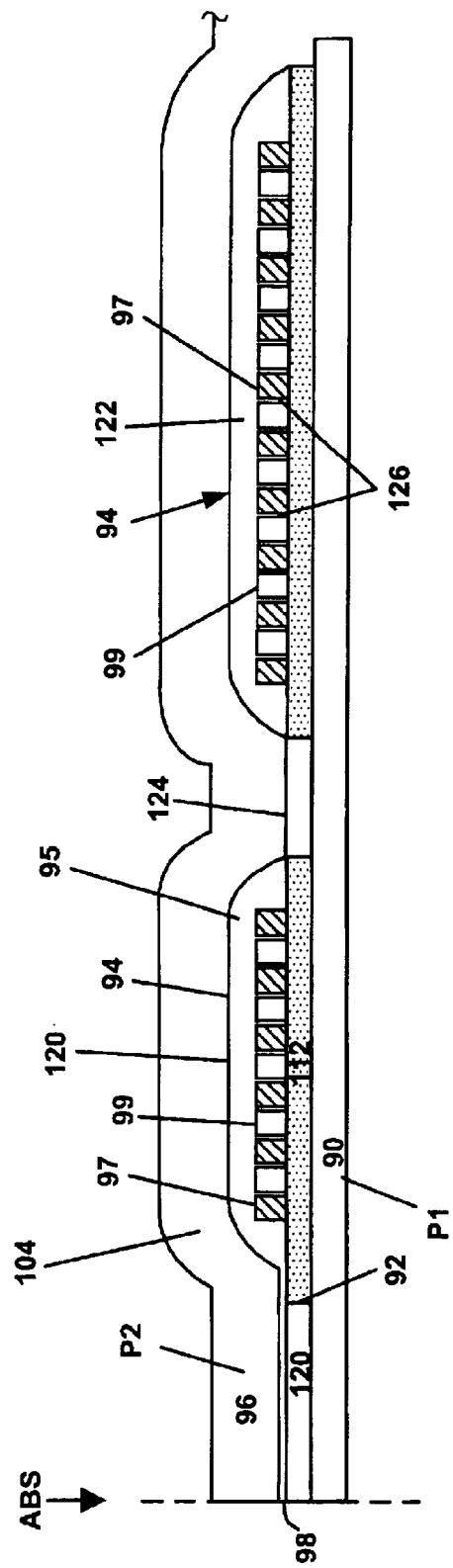
FIG. 5 is a cross-sectional view of the write head of the read/write element of FIG. 4 taken along line 4—4, illustrating a double winding twin coil of the present invention.
Figure 6:
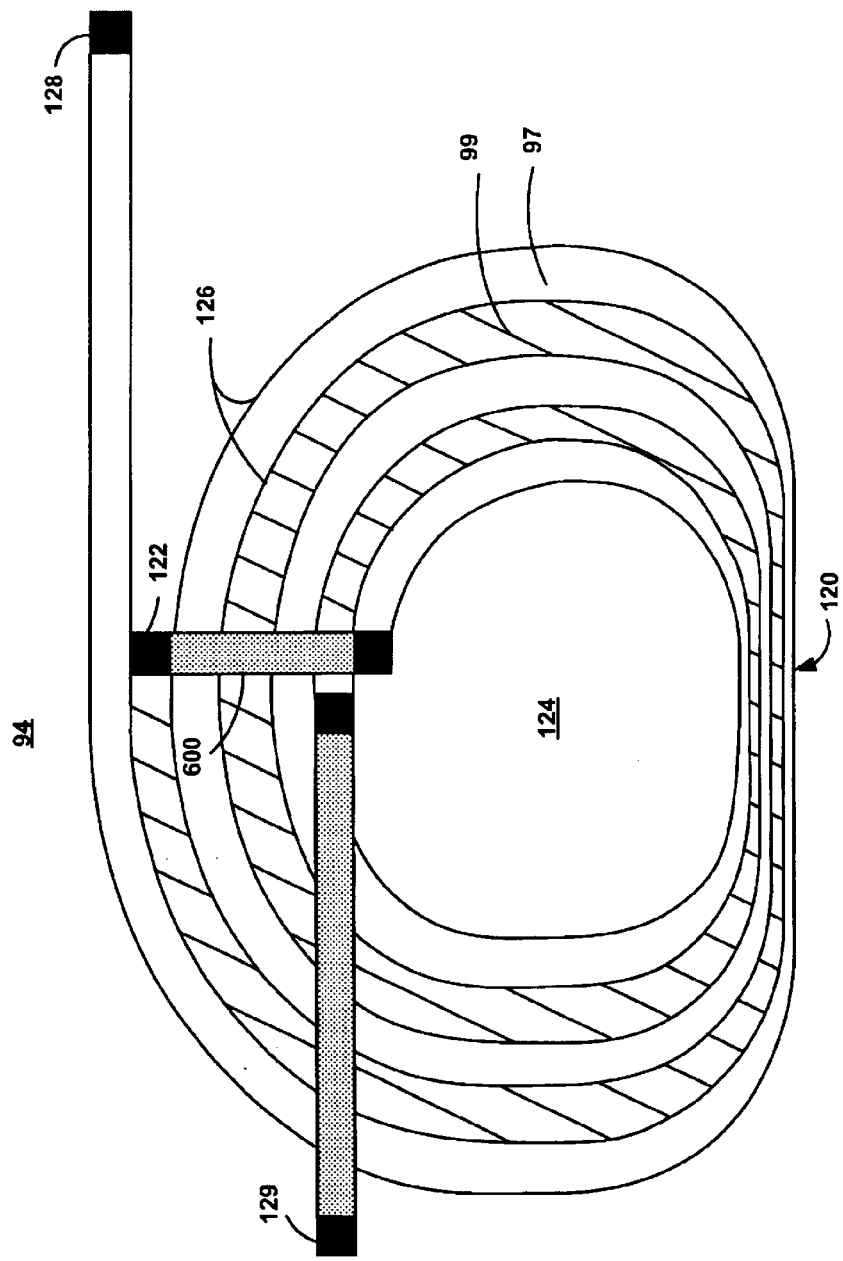
FIG. 6 is a top view of the double winding twin coil made according to the present invention of FIG. 5.

With reference to FIGS. 5 and 6, a write twin coil 94 made according to the present invention, forms part of the write section 60, and includes a plurality of multi-layered conductive first coil elements (or conductors) 97 and second coil elements 99, only a few of which are illustrated. The twin coil 94 is topologically divided into a front region 120 disposed adjacent to the top pole P2, an aft region 122, and a central region 124.

The coil elements 97 and 99 are formed in an alternating manner within an insulating layer 95 and are spirally wound starting from the front region 120 and terminating in the aft region 122. The width of the coil elements 97 and 99 generally varies from approximately 1.0 $\mu$m in the front region 120 to approximately 3.0 $\mu$m in the aft region 122. A thin layer of dielectric material 126 is interposed between the coil elements 97 and 99 to serve as insulation.

The forward-facing portions of the coil elements 97 and 99 are generally flattened in the front region 120 and reduced to a smallest width, for the coil elements 97 and 99 to fit in a very limited yoke length, for reducing the coil size. The central region 124 is generally made of a dielectric material and provides the necessary physical separation between the front region 120 and aft region 122 for magnetic induction during a write operation.

With reference to FIG. 5, the top pole P2 extends into a yoke 104. The yoke 104 covers substantially the entire front region 120 of the write coil 94. The yoke 104 is made of a material such as $Al_2O_3$. The length of the yoke 104 is referred to as the yoke length which determines the size of the coil 94. The coil 94 is formed over an insulation layer 112, which is made of a material such as $Al_2O_3$. During fabrication, the insulation layer 112 serves as a protective layer for the bottom pole P1 for potential damage during the coil fabrication.

With reference to FIG. 6, an output electrical lead 128 is connected to an outer terminal end of the first coil 97 in the aft region 122, and an input electrical lead 129 is connected to an inner terminal end of the second coil 99 in the central region 124. Additionally, an interconnect 600 provides an electrical connection between an outer terminal end of the second coil 99 in the aft region 121, and an inner terminal end of the first coil 97 in the central region 124.

During a write operation, a voltage difference between the input lead 129 and output lead 128 causes an electrical current $I_W$ to flow through the coil 94 to induce a magnetic flux flow through the write gap 98. Changes in the flux flow across the write gap 98 produce the different magnetic orientations of vertical magnetized regions or domains in the disk 14 during a write operation.

The process for fabricating the enhanced inductive double winding twin coil 94 according to a preferred embodiment of the present invention will now described in connection with FIGS. 7 to 20.

Figure 7:
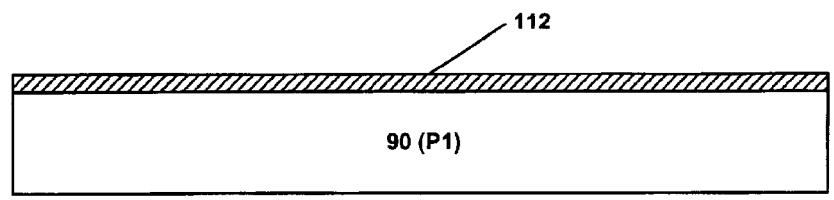
FIGS. 7 through 15 illustrate a manufacturing sequence for fabricating first coil elements of the double winding twin coil of FIGS. 5 and 6 according to a preferred embodiment of the present invention.

With reference to FIG. 7, the fabrication of the inductive coil 94 begins with the deposition of a stopping layer 112 preferably made of $Al_2O_3$ on top of the bottom pole P1. The stopping layer 112 prevents the etchant from permeating through the bottom pole P1 to cause damage during the fabrication of coil 94.

Figure 8:
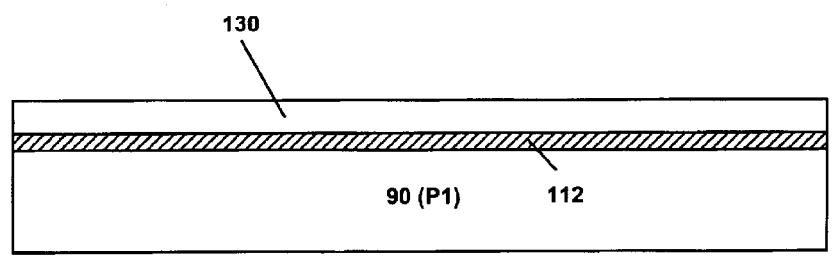

With reference to FIG. 8, a layer 130 of photo resist material is deposited over the entire surface of the stopping layer 112. The photo resist material is photo-sensitive, so that upon exposure to a light source, its chemistry is altered to allow the exposed material to be removed by a developer solution, leaving behind the unexposed material which forms the coil elements 97 and 99.

Figure 9:
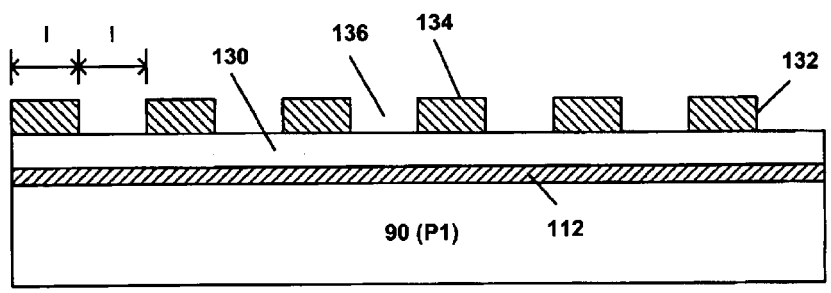

With reference to FIG. 9, a photo mask layer 132 is placed over the photo resist layer 130. A pattern of coil elements is formed on the photo mask layer 132, and is comprised of masked areas 134 and unmasked areas 136. The masked areas 134 are made of a photo mask material that blocks light transmission therethrough, preventing the underlying areas of the photo resist layer 130 from being exposed. The unmasked areas 136 are formed as opening in the photo mask layer 132 with the purpose of allowing light to transmit through and expose the areas in the photo resist layer 130. In a preferred embodiment, a masked area 134 and its separation gap are of equal width "I" which typically ranges from approximately 0.2 to 1 $\mu$m.

Figure 10:
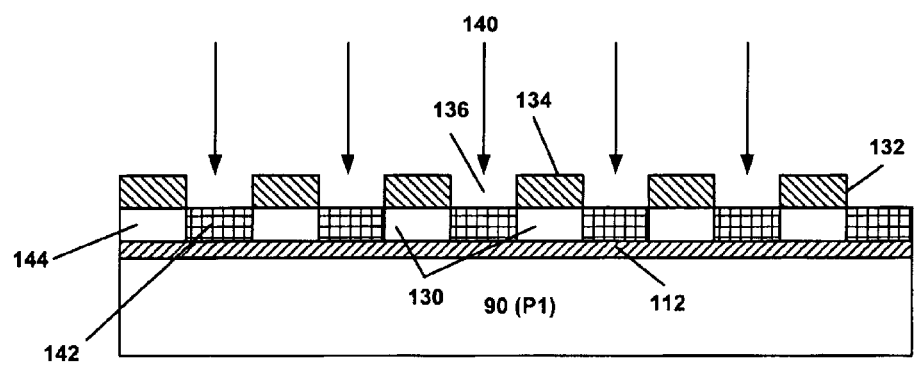

With reference to FIG. 10, an ultraviolet light source 140 is directed toward the photo resist layer 130 through the photo mask layer 132. The light source 140 transmits through the unmasked areas 136 to the exposed areas 142 of the photo resist layer 130, while the shielded areas 144 of the photo resist layer 132 are unaffected as they are optically shielded by the masked areas 134 of the photo mask 132.

Figure 11:
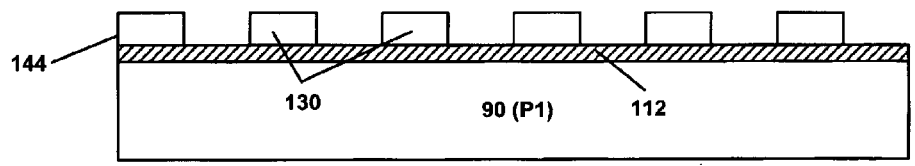

With reference to FIG. 11, the photo mask layer 132 is removed and a developer solution is applied to the photo resist layer 130. The developer solution chemically reacts with the photo resist material in the exposed areas 142 of the photo resist layer 130 and allows them to be removed. Consequently, a patterned photo resist layer 130 is formed by the remaining unexposed areas 144.

Figure 12:
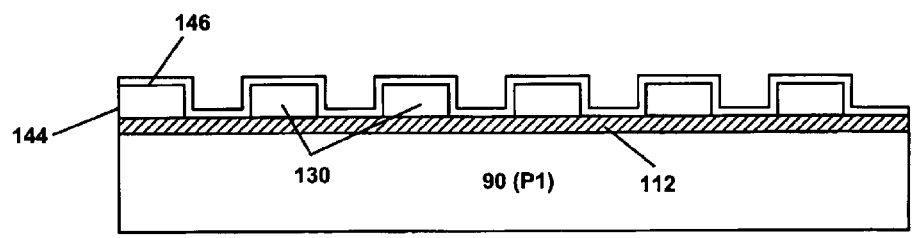

With reference to FIG. 12, a copper (Cu) seed layer 146 is deposited over the patterned photo resist layer 130 in preparation for the plating step to form the first coil elements 97.

Figure 13:
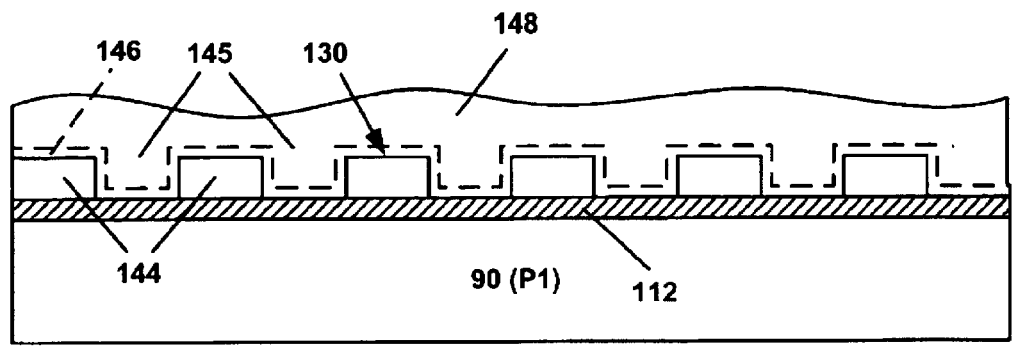

With reference to FIG. 13, a copper plating layer 148 is formed over the patterned copper seed layer 146 and fills in the gaps 145 in between the copper covered unexposed areas 144 of the photo resist layer 130 to a height above the top of the copper seed layer 146. The copper seed layer 146 is then integrally fused into the copper plating layer 148.

Figure 14:
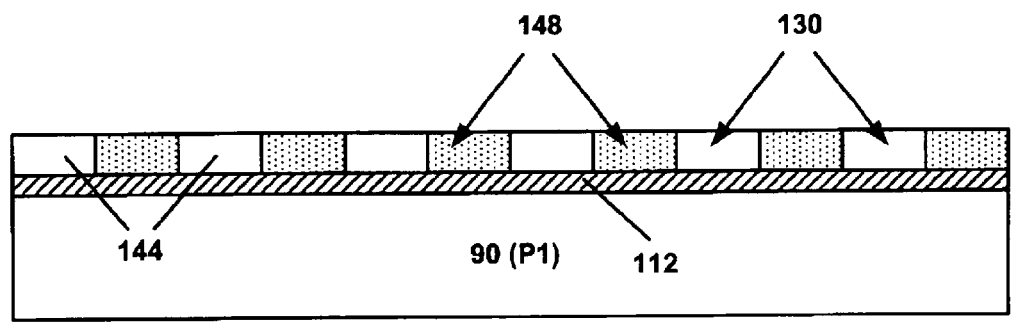

With reference to FIG. 14, a planarization step involving a chemical milling polishing (CMP) process is used to remove the excess copper material, and to form a level surface on the copper plating layer 148 to the same height as the patterned photo resist layer 130.

Figure 15:
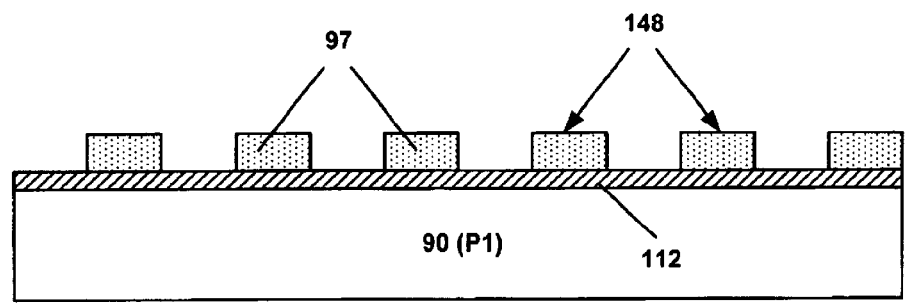

With reference to FIG. 15, the patterned photo resist layer 130 is removed using a photo stripping solution that is not chemically reactive with the copper material of the copper plating layer 148. This is in contrast with the prior art where wet chemical solution is use for pattern formation, which solution may etch damage to the copper material.

Furthermore, the stopping layer 112 is impervious to the photo stripping solution, thus preventing potential damage to the bottom pole P1. Subsequent to the planarization and the removal of the patterned photo resist layer 130, the first coil elements 97 are formed from the copper plating layer 148.

Figure 16:
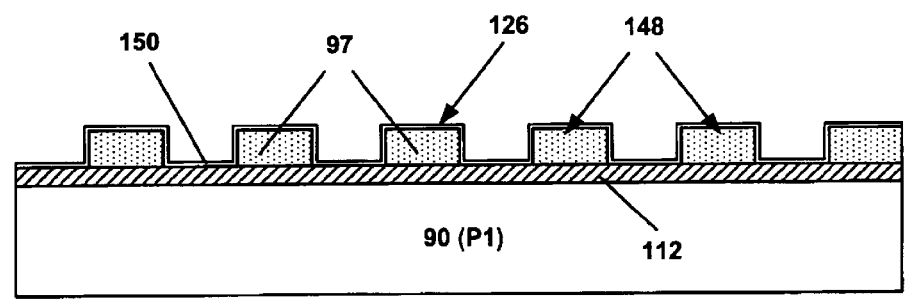

With reference to FIG. 16, a layer 150 of dielectric material, preferably made of $SiO_2$, is formed over the first coil elements 97 to serve as the insulating layer 126 between the first coil elements 97 and the second coil elements 99 to be made in the following steps. The enhanced coil process of the present invention uses the dielectric layer 126 between the coils elements 97, 99, which dielectric layer 126 is preferably deposited by a PECVD (Plasma-Enhanced Chemical Vapor Deposition) process.

The present invention does not use chemical or wet etching processes that attack the metallic first coil elements 97, and thus avoiding damage to the first coil elements 97. Instead, the current process uses a photo stripping process or a reactive ion etching (RIE) process to remove the excess first coil pattern after completion of the planarization of the first coil elements 97.

Figure 17:
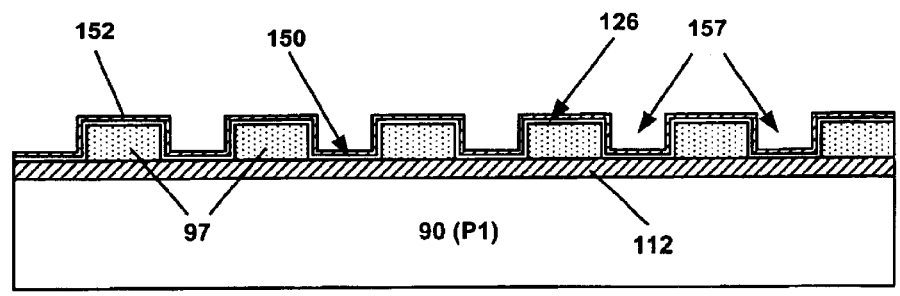

With reference to FIG. 17, a copper seed layer 152 is deposited over the dielectric layer 150 in preparation of the plating step to form the second coil elements 99.

Figure 18:
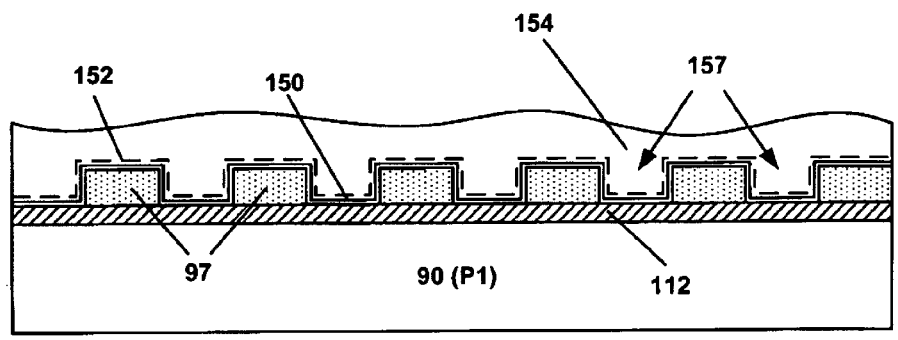

With reference to FIG. 18, a copper plating layer 154 is deposited over the copper seed layer 152 and fills in the gaps 157 in between the first coil elements 97 to a height above the top of the dielectric layer 150. The copper seed layer 152 is then integrally fused into the copper plating layer 154.

Figure 19:
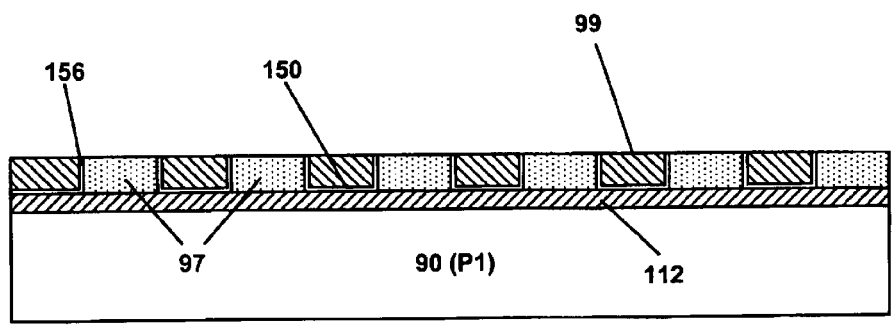

With reference to FIG. 19, the copper plating layer 154 undergoes a planarization step using Chemical Mechanical Polishing (CMP) to form a level surface of the copper plating layer 154 at the same level as the top of the first coil elements 97 with the dielectric layer 150 above the top of the first coil elements 97 completely removed. The second coil elements 99 are now formed from the copper plating layer 154 and separated from the first coil elements 97 by the vertical portion 156 of the dielectric layer 150. The double winding twin coil 94 of the present invention is thus complete with a resulting double packing coil density to maximize the size constraint utilization of the twin coil 94.

Figure 20:
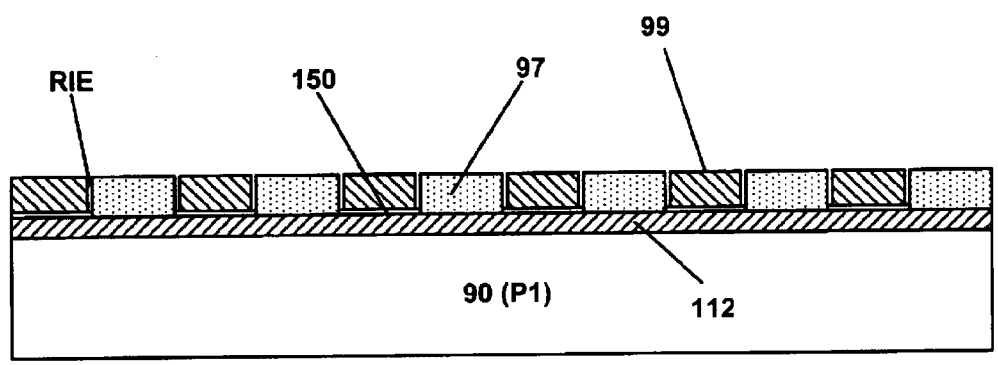
FIG. 20 illustrates an optional reactive ion etching process for removing an insulating dielectric layer interposed between the first and second coil elements.

With reference to FIG. 20, a distinguishing feature of the present invention is the optional use of reactive ion etching (RIE) to remove the dielectric material from the vertical portions 156 of the dielectric layer 150 interposed between the first and second coils elements 97 and 99, if there is a quality assurance concern with the dielectric separation. The use of RIE does not pose harm to the enhanced inductive coil design of the present invention as REI is known to be chemically inert to and thus does not attack copper.

Another distinguishing feature of the present invention is the elimination of a second photo mask process for forming the second coil elements 99, thereby effectively creating a self-alignment process. This is a significant improvement over the conventional coil fabrication process whereby a second photo mask process is used to form the second coil elements, thus requiring the pattern on the photo mask to accurately aligned with the already formed first coil elements.

The alignment process of the conventional coil process becomes exasperated as the coil size is reduced, thus creating a potential misalignment which could adversely affect the quality and the production of the conventional inductive coils. As a result, the enhanced coil process of the present invention has greatly increased the quality of the inductive coils, while reducing the production cost as the fabrication process has become more efficient than the convention process.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. An inductive coil for use in a write head of a data storage system, comprising:
   first coil elements that are formed over a stopping layer, said first coil elements having a metallic composition and being separated by spaces;
   an insulation layer formed on the first coil elements and within the spaces;
   second coil elements that are formed within the spaces, said second coil elements having a metallic composition;
   each of the first and second coil elements having a top surface; and
   wherein the first and second coil elements are arranged in an alternating horizontal arrangement so that the top surfaces of the first and second coil elements are substantially horizontally co-planar.

2. The coil of claim 1, wherein the insulation layer is formed by a plasma enhanced chemical vapor deposition process.

3. The coil of claim 1, wherein the metallic composition of the first coil elements is inert relative to a reactive ion etching process used to remove at least a portion of the insulation layer.

4. The coil of claim 1, wherein the second coil elements are formed by a plating process.

5. The coil of claim 4, wherein the second coil elements are further formed by a deposition process.

6. The coil of claim 1, wherein each of the first coil elements and the second coil elements has a generally rectangularly shaped cross-section.

7. The coil of claim 1, wherein each of the first coil elements and the second coil elements has a generally trapezoidally shaped cross-section.

8. The coil of claim 1, further comprising a protective insulating layer that encapsulates the first coil elements, and the second coil elements.

9. The coil of claim 8, wherein the protective insulating layer is made of any of photoresist material, alumina, or silicon dioxide.

10. The coil of claim 1, that is topologically divided into a front region, a central region, and an aft region.

11. The coil of claim 10, wherein the first and second coil elements are generally flattened in the front region.

12. The coil of claim 11, wherein the first and second coil elements are reduced to a minimal width in the front region to reduce the coil size.

13. The coil of claim 12, wherein the central region is generally made of a dielectric material and provides physical separation between the front region and aft region for magnetic induction during a write operation.

14. The coil of claim 13, wherein the first coil elements and the second coil elements are spirally wound starting from the front region and terminating in the aft region.

15. The coil of claim 14, wherein each of the first and second coil elements has a width that varies between approximately 1.0 µm in the front region to approximately 3.0 µm in the aft region.

16. The coil of claim 1, further comprising an interconnect that connects a terminal end of the first coil elements to a terminal end of the second coil elements, so that the first and second coil elements form an integral coil.

17. A write head comprising an inductive coil for use in a data storage system, the inductive coil comprising:
    first coil elements that are formed over a stopping layer, said first coil elements having a metallic composition and being separated by spaces;
    an insulation layer formed on the first coil elements and within the spaces;
    second coil elements that are formed within the spaces, said second coil elements having a metallic composition;
    each of said first and second coil elements having a top surface; and
    wherein the first and second coil elements are arranged in an alternating horizontal arrangement so that the top surfaces of the first and second coil elements are substantially horizontally co-planar.

18. The write head of claim 17, wherein the insulation layer is formed by a plasma enhanced chemical vapor deposition process.

19. The write head of claim 17, wherein the metallic composition of the first coil elements is inert relative to a reactive ion etching process used to remove at least a portion of the insulation layer.

20. The write head of claim 17, wherein the second coil elements are formed by a plating process.

21. The write head of claim 20, wherein the second coil elements are further formed by a deposition process.

22. The write head of claim 17, wherein each of the first coil elements and the second coil elements has a generally rectangularly shaped cross-section.

23. The write head of claim 17, wherein each of the first coil elements and the second coil elements has a generally trapezoidally shaped cross-section.

24. The write head of claim 17, further comprising a protective insulating layer that encapsulates the first coil elements, and the second coil elements.

25. The write head of claim 24, wherein the protective insulating layer is made of any of photoresist material, alumina, or silicon dioxide.

26. The write head of claim 17, that is topologically divided into a front region, a central region, and an aft region.

27. The write head of claim 26, wherein the first and second coil elements are generally flattened in the front region.

28. The write head of claim 27, wherein the first and second coil elements are reduced to a minimal width in the front region to reduce the coil size.

29. The write head of claim 28, wherein the central region is generally made of a dielectric material and provides physical separation between the front region and aft region for magnetic induction during a write operation.

30. The write head of claim 29, wherein the first coil elements and the second coil elements are spirally wound starting from the front region and terminating in the aft region.

31. The write head of claim 30, wherein each of the first and second coil elements has a width between approximately
    1.0 µm in the front region to approximately 3.0 µm in the aft region.

32. The write head of claim 17, further comprising an interconnect that connects a first terminal end of at least one of the first coil elements to a second terminal end of at least one of the second coil elements, so that the first and second coil elements form at least one integral coil.

* * * * *